(12) United States Patent
Chen et al.

(10) Patent No.: US 8,080,128 B2
(45) Date of Patent: Dec. 20, 2011

(54) METHOD FOR INCREASING THE CONCENTRATION OF XYLOSE IN LIGNOCELLULOSIC HYDROLYSATE

(75) Inventors: Wen-Hua Chen, Xindian (TW); Sheng-Shieh Chen, Pingjhen (TW); Wen-Song Hwang, Longtan Township, Taoyuan County (TW); Lee-Chung Men, Zhonghe (TW); Jia-Baau Wang, Taipei (TW)

(73) Assignee: Atomic Energy Council - Institute of Nuclear Research, Taoyuan County (TW)

( * ) Notice: Subject to any disclaimer, the term of this patent is extended or adjusted under 35 U.S.C. 154(b) by 176 days.

(21) Appl. No.: 12/651,123

(22) Filed: Dec. 31, 2009

(65) Prior Publication Data

US 2011/0155336 A1 Jun. 30, 2011

(51) Int. Cl.
*D21C 3/26* (2006.01)
(52) U.S. Cl. ........... 162/19; 162/181.1; 162/43; 162/17; 162/20
(58) Field of Classification Search ........... 162/60, 162/43, 17, 181.1, 14, 18, 233, 238
See application file for complete search history.

(56) References Cited

U.S. PATENT DOCUMENTS

| 5,424,417 | A | 6/1995 | Torget et al. | |
|---|---|---|---|---|
| 6,419,788 | B1 * | 7/2002 | Wingerson | 162/14 |
| 6,620,292 | B2 * | 9/2003 | Wingerson | 162/19 |
| 2008/0029233 | A1 * | 2/2008 | Wingerson et al. | 162/60 |

OTHER PUBLICATIONS

Yat, S.C. et al., Kinetic characterization for dilute sulfuric acid hydrolysis of timber varieties and switchgrass, Bioresource Technology, vol. 99, Sep. 27, 2007, pp. 3855-3863.
Kadam, K.L. et al., Flexible biorefinery for biorefinery for producing fermentation sugars, lignin and pulp from corn stover, Journal of Industrial Microbiology and Biotechnology, vol. 35, Feb. 14, 2008, pp. 331-341.
Öhgren, K. et al., Fuel ethanol production from steam pretreated corn stover using SSF at higher dry matter content, Biomass & Bioenergy, vol. 30, Apr. 3, 2006, pp. 863-869, 2006.

* cited by examiner

*Primary Examiner* — Mark Halpern
(74) *Attorney, Agent, or Firm* — Jackson IPG PLLC; Demian K. Jackson

(57) ABSTRACT

Disclosed is a method for increasing the concentration of xylose in lignocellulosic hydrolysate. The method includes the step of extruding lignocellulosic material and mixing the lignocellulosic material with diluted acid and the step of conducting hot-water extraction on the mixture. Hence, the concentration of the xylose in the lignocellulosic hydrolysate can achieve a high concentration of 60 g/L, and the yield of the xylose can reach to 90%.

11 Claims, 4 Drawing Sheets

METHOD FOR INCREASING THE CONCENTRATION OF XYLOSE IN LIGNOCELLULOSIC HYDROLYSATE

FIELD OF THE INVENTION

The present invention relates to a method for increasing the concentration of xylose in lignocellulosic hydrolysate and, more particularly, to a method including the step of twin-screw extruding with acid and the step of hot-water extraction to increase the concentration and yield of xylose in hydrolysate made by hydrolyzing ligoncellulosic material with diluted acid.

DESCRIPTION OF THE RELATED ARTS

Bio-ethanol or cellulosic ethanol is deemed a potential energy source to replace fossil fuel. Current raw materials for bio-ethanol include grains and sucrose. The production of bio-ethanol from grains and sucrose is controversial for causing food shortage. This is where lignocellulosic material comes in. Ignocellulosic materials such as agricultural waste, cork and hardwood residues are potential sources of sugars for bioethanol production.

Typical lignocellulosic material includes 60% to 80% of cellulose and hemicellulose and 15% to 25% of lignin. The cellulose is converted to hexose (mainly glucose) while the hemicellulose is converted to pentose (mainly xylose). Then, such monosaccharide is fermented into ethanol. In the process, the lignocellulosic material pretreatment is necessary. Furthermore, the choice for a pretreatment technology heavily influences cost and performance in subsequent hydrolysis and fermentation processes. Hence, the pretreatment of the lignocellulosic material is crucial to the production of the bio-ethanol from the lignocellulosic material.

Fermentable carbohydrates constitute 60% to 70% of the dry weight of typical lignocellulosic material. In the production of fuel-class bio-ethanol, cellulose and hemicellulose are extracted from the lignocellulosic material, and converted to fermentable carbohydrates. Then, the carbohydrates are fermented into bio-ethanol. The bio-ethanol is distilled purified and dehydrated to form fuel-class ethanol. However, it requires a higher technique to produce bio-ethanol from liqnocellulosic material than from carbohydrate and starch. Hence, there has not been any commercial production of bio-ethanol from lignocellulosic material.

In a typical process for producing bio-ethanol, before converting cellulose into carbohydrate, pretreatment of lignocellulosic material is required to extract xylose from hemicellulose while eliminating or reducing the protective sheath from around the cellulose of these substrates. The pretreatment includes chemical treatment and physical treatment. The chemical treatment may be treatment with alkali or acid for example. The physical treatment may be crushing, cooking or steam explosion for example. Diluted-acid pretreatment can increase the yield of the carbohydrates from the hemicellulose, and is therefore the most popular method. In general, the obtained xylose concentration is however too low, 7 to 40 g/L (Yat, S. C., Berger, A., Shonnard, D. R. Kinetic characterization for dilute sulfuric acid hydrolysis of timber varieties and switchgrass, Bioresource Technology 99, 3855-3863, 2008; Torget, R. W., Kadam, K. L., Hsu, T. A., Philippidis, G. P., Wyman, C. E. Prehydrolysis of lignocelluloses, U.S. Pat. No. 5,424,417; 1995). Only PureVision process can achieve a higher concentration of 50 g/L (Kadam, K. L., Chin, C. Y., Brown, L. W. Flexible biorefinery for biorefinery for producing fermentation sugars, lignin and pulp from corn stover, Journal of Industrial Microbiology and Biotechnology 35, 331-341, 2008). The cost is however increased taking the economy and environmental protection into consideration. Furthermore, it has been shown that the concentration of bio-ethanol from cellulose and hemicellulose must be higher than 4% (40 g/L) to reduce the amount of energy consumed in the distillation of the bio-ethanol and increase the competitiveness of the bio-ethanol (Ohgren, K., Rudolf, A., Galbe, M., Zacchi, G. Fuel ethanol production from steam pretreated corn stover using SSF at higher dry matter content, Biomass & Bioenergy 30, 863-869, 2006). As discussed above, the cost of the bio-ethanol made from the lignocellulosic material is still higher than that of the bio-ethanol made from carbohydrates and starch.

The present invention is therefore intended to obviate or at least alleviate the problems encountered in prior art.

SUMMARY OF THE INVENTION

It is an objective of the present invention to provide a method for increasing the concentration and yield of xylose in lignocellulosic hydrolysate.

It is another objective of the present invention to provide xylose-rich lignocellulosic hydrolysate for use in the production of bio-ethanol, xylitol, non-nutritive sweetener of food or beverage or feed for pets.

It is another objective of the present invention to provide a method for increasing the concentration and yield of xylose in lignocellulosic hydrolysate while leaving 90% of glucose in solids to facilitate the fermentation of the xylose and glucose and increase the concentration of resultant bio-ethanol.

To achieve the foregoing objectives, the method includes the step of twin-screw extruding lignocellulosic material with diluted acid and the step of conducting hot-water extraction on the mixture. Hence, the concentration of the xylose in the lignocellulosic hydrolysate is 40 to 60 g/L, and the yield of the xylose is 70% to 90%.

Other objectives, advantages and features of the present invention will become apparent from the following description referring to the attached drawings.

BRIEF DESCRIPTIONS OF THE DRAWINGS

The present invention will be described via the detailed illustration of the preferred embodiment referring to the drawings.

DESCRIPTION OF THE PREFERRED EMBODIMENT

Figure 1:
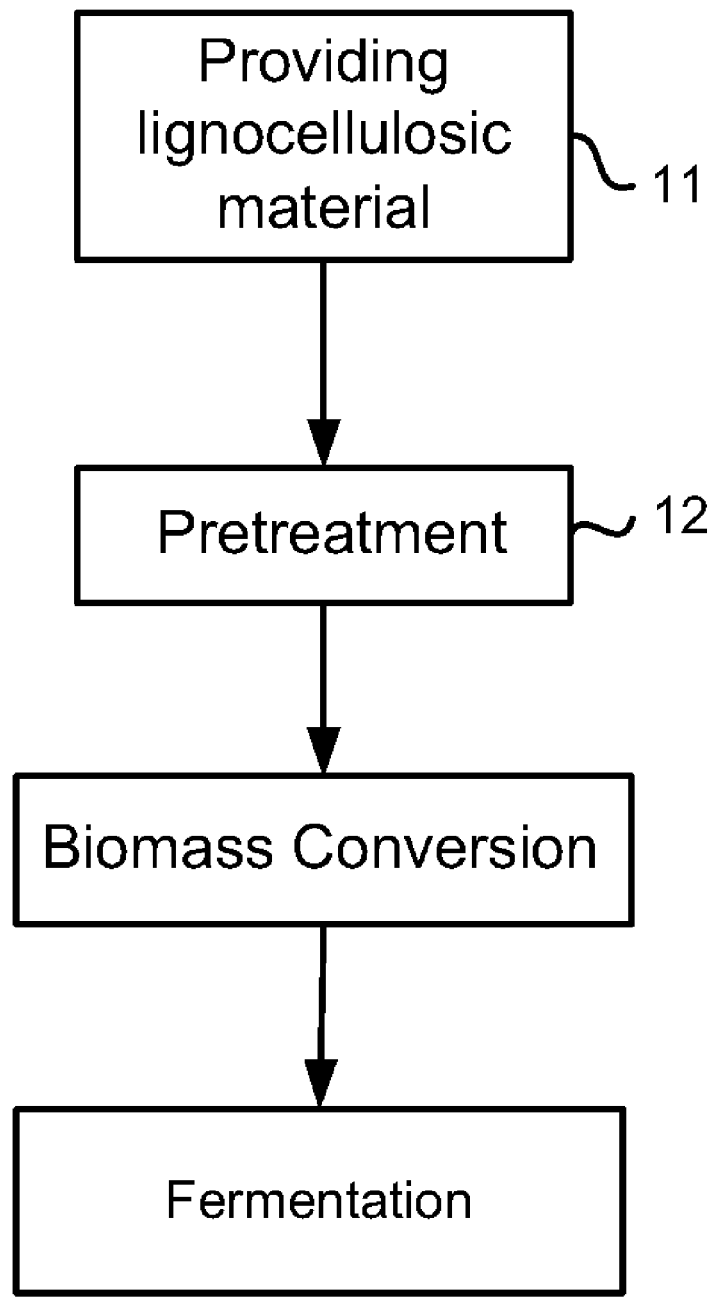
FIG. 1 is a flow chart of a method for increasing the concentration of xylose in lignocellulosic hydrolysate according to the present invention.
Figure 2:
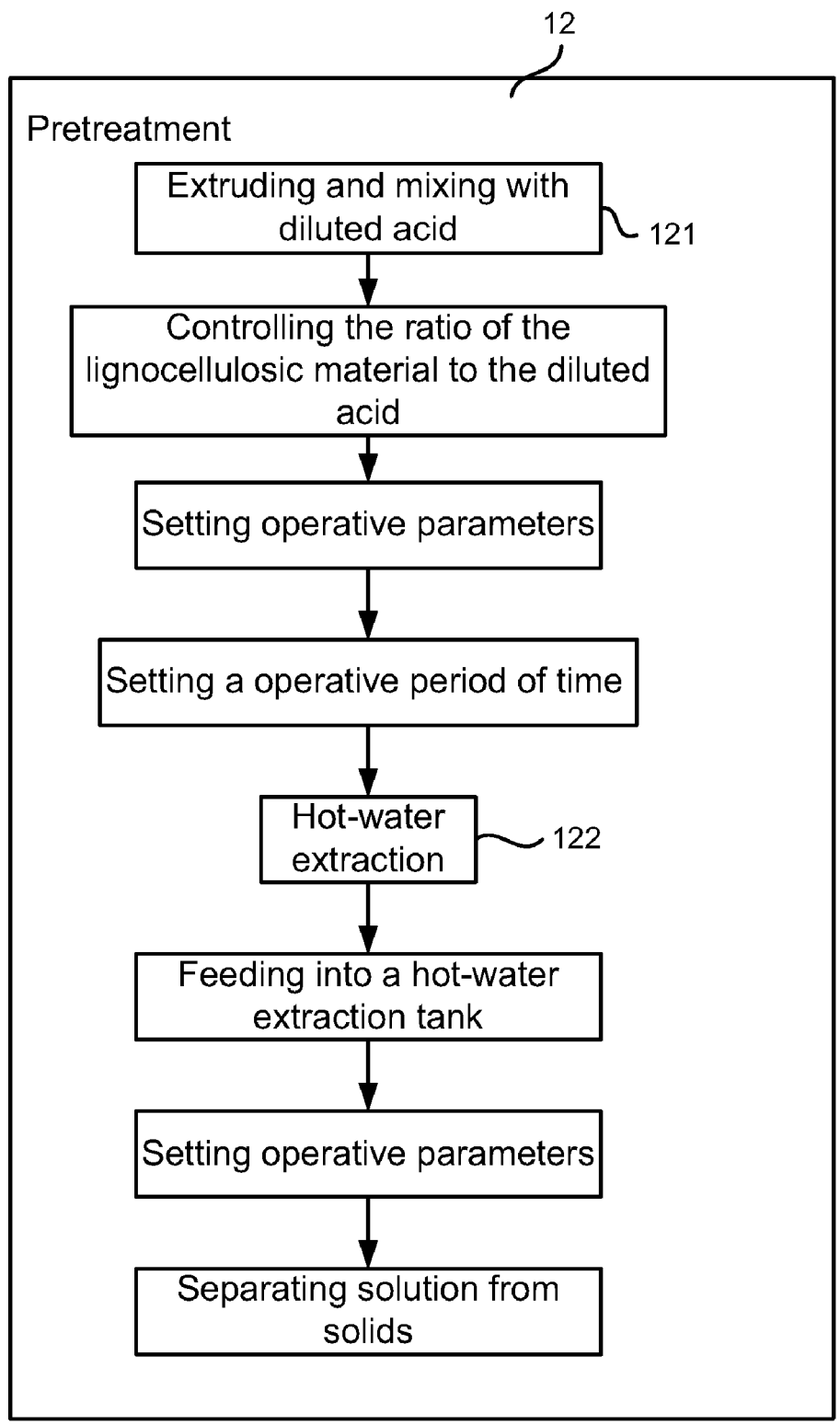
FIG. 2 is a flow chart of a pretreatment of the method shown in FIG. 1.

Referring to FIGS. 1 and 2, there is shown a method for increasing the concentration of xylose in lignocellulosic hydrolysate according to the present invention. At 11, there is provided lignocellulosic material of a proper size.

At 12, pretreatment is conducted on the lignocellulosic material. In detail, at 121, the lignocellulosic material is continuously extruded and mixed with diluted acid to break the structure thereof. The extruding and mixing is done with a machine described in Taiwanese Patent Application No. 097100129 for example. The weight ratio of the lignocellulosic material to the diluted acid is controlled via regulating the feed rate of the lignocellulosic material and the flow rate of the diluted acid. A screw is operated at a predetermined rotational speed for a predetermined period of time to produce an intended amount of mixture.

At 122, the mixture is fed into a hot-water extraction tank. A proper amount of steam is introduced into the hot-water extraction tank. The hot-water extraction tank is equipped with a stirring device. Cooking is done at a predetermined temperature, pressure and stirring rate for a predetermined period of time. The steam is used to achieve the predetermined temperature. Water condensed from the steam is used to cook. After the cooking, solution and solids are moved to a solid-liquid separating device from the hot-water extraction tank. The solution is separated from the solids with the solid-liquid device. The solution is xylose hydrolysate.

With the pretreatment, in proper conditions, a solid-to-liquid ratio of 30% is achieved. The concentration of the xylose in the solution is increased to 60 g/L, and the yield of the xylose is increased to 90%.

According to the preferred embodiment of the present invention, the lignocellulosic material is rice straw shorter than 10 mm. The feed rate of the rice straw is 6.5 kg/h. The flow rate of the diluted acid is 13 kg/h. The straw-to-acid ratio is 50:100. The concentration of the diluted acid is 3%. The rotational speed of the screw is 40 rpm. The average temperature is 120° C. The step of extruding and mixing lasts for 3.5 hours to provide 60 kg of mixture containing 70% of water.

Then, the 60 kg of mixture and a proper amount of steam are fed into the hot-water extraction tank. The temperature is 130° C. The cooking lasts for 20 minutes. After the cooking, the xylose solution and the solids are moved to the solid-liquid separating device from the hot-water extraction tank. The xylose solution is separated from the solids with the solid-liquid separating device.

In another embodiment, the liqnocellulosic material may be bagasse, silvergrass, napiergrass, switchgrass, corn stover, wood, bamboo or algae for example.

In the step of extruding and mixing, the diluted acid may be 1%, 1.5%, 2% or 3% sulfuric acid solution, and the average temperature is 120° C., and the rotational speed of the screw is 40 rpm. The hot-water extraction may last for 10, 20 or 30 minutes, and the temperature may be 130° C., 140° C. or 145° C. therein.

Figure 3:
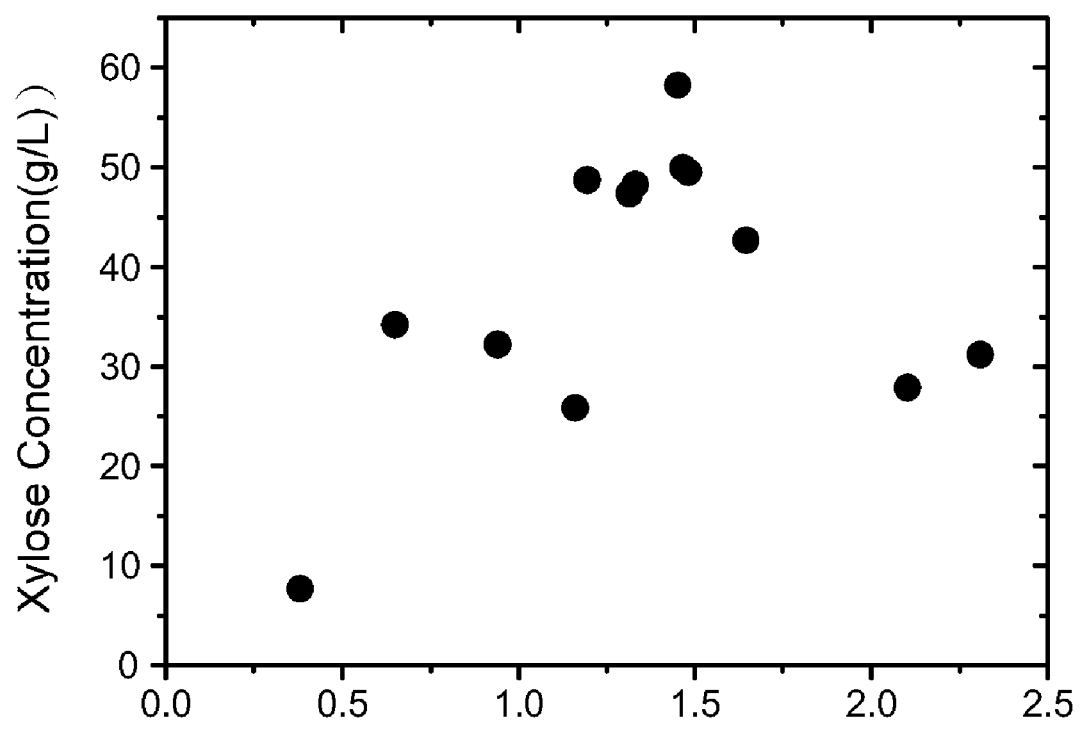
FIG. 3 is a chart of the concentration of xylose versus a combined severity factor in the method shown in FIG. 1.
Figure 4:
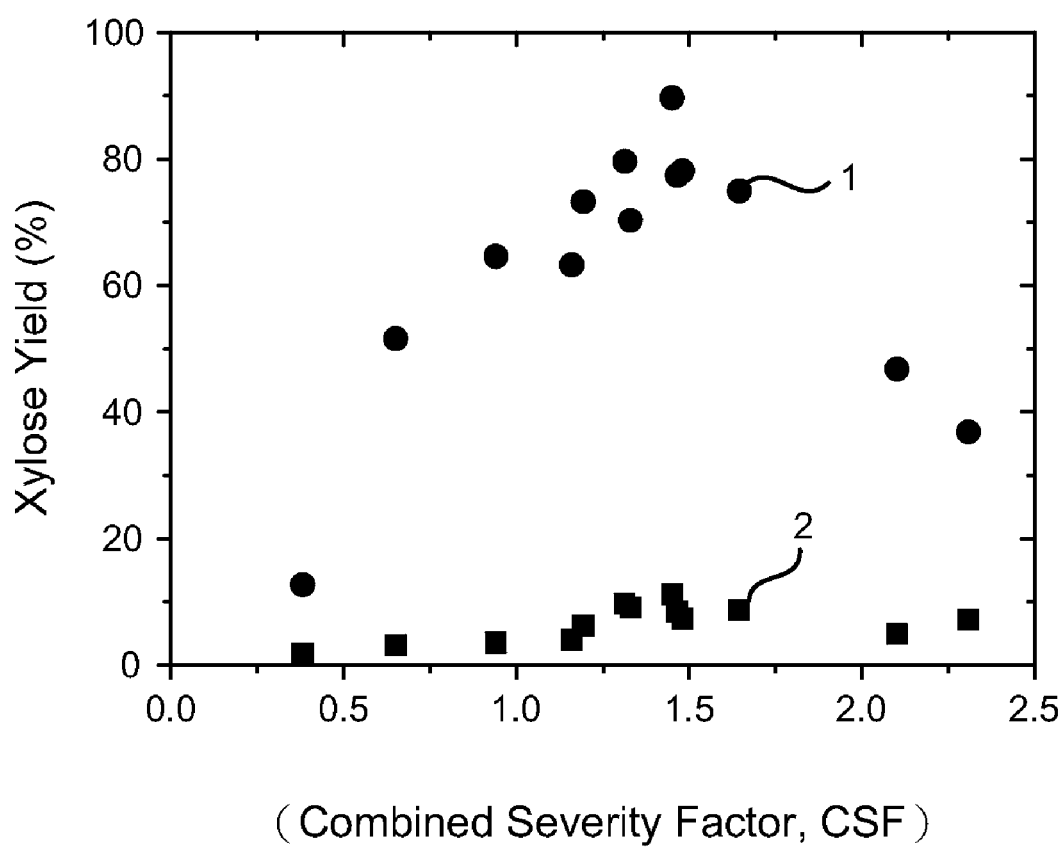
FIG. 4 is a chart of the yield of xylose and glucose versus the combined severity factor in the method shown in FIG. 1.

Referring to FIGS. 3 and 4, the concentration and yield of the xylose change with a combined severity factor ("CSF"). The relation is regulated in the following equations:

$$CSF = \log R0 - pH$$

$$R0 = t \cdot \exp[(TH - TR)/14.75]$$

wherein t stands for the period for reaction, TH the temperature of reaction, TR the reference temperature (100° C.), pH the pH of the hydrolysate.

When the CSF is 1.2 to 1.5, the concentration of the xylose is 50 to 60 g/L, and the yield of the xylose is 80% to 90%, and the yield of glucose is lower than 10%. That is, the concentration and yield of the xylose are increased while the yield of the glucose is reduced. That is, at least 90% of the cellulose remains in the solids which can convert to glucose by enzyme hydrolysis for producing ethanol. Therefore, the concentration of the ethanol made by the fermentation of the xylose and glucose will be high. Compared with prior art, the pretreatment of the present invention is able to increase both of the concentration and yield of the xylose. The xylose hydolysate can be used to make ethanol, xylitol, normutritive sweetener for food or beverage, or feed for pets.

As discussed above, by using the step of extruding and mixing and the step of hot-water extraction, the pretreatment succeeds to increase both of the concentration and yield of the xylose while reducing the yield of the glucose. Thus, the size of a fermentation tank used in following steps and the amount of energy consumed in the following steps can be reduced. The demand on energy and related problems are avoided.

The present invention has been described via the detailed illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. A method for increasing the concentration of xylose in lignocellulosic hydrolysate comprising the steps of:
    extruding lignocellulosic material and mixing the lignocellulosic material with diluted acid at a feed rate of between about 6 and 7 kg/hr and a flow rate of between about 12 and 14 kg/hr, wherein the speed of a rotational screw is between about 30 and 150 rpm at the barrel temperature of 80-160° C., creating a mixture;
    feeding the resulting mixture into a hot-water extraction tank and cooking the mixture at an average temperature of 130-160° C. for 10-30 minutes; and
    separating the liquids from the solids using a solid separating device to produce a lignocellulosic hydrolysate; wherein the concentration of the xylose in the lignocellulosic hydrolysate is 40 to 60 g/L and wherein the yield of the xylose is 70% to 90%.

2. The method according to claim 1, wherein the lignocellulosic material is selected from a group consisting of rice straw, bagasse, silvergrass, napiergrass, switchgrass, corn stover, wood, bamboo and algae.

3. The method according to claim 1 comprising the step of using a twin-screw extruder to extrude the lignocellulosic material and mix the lignocellulosic material with the diluted acid.

4. The method according to claim 3, wherein the step of hot-water extraction lasts for 10 to 30 minutes, and the temperature therein is 130° C. to 145° C.

5. The method according to claim 1, wherein the feed rate of the lignocellulosic material is 6.5 kg/h.

6. The method according to claim 1, wherein the flow rate of the diluted acid is 13 kg/h.

7. The method according to claim 1, wherein the concentration of the diluted acid is 3%.

8. The method according to claim 1, wherein the rotational speed of the screw is 40 rpm.

9. The method according to claim 1, wherein the barrel temperature of the extruder is 120° C.

10. The method according to claim 1, wherein the cooking temperature is 130° C.

11. The method according to claim 1, wherein the cooking time is 20 min.

* * * * *